(12) United States Patent
Niederberger

(10) Patent No.: US 11,516,594 B2
(45) Date of Patent: Nov. 29, 2022

(54) SENSOR ARRANGEMENT AND METHOD

(71) Applicant: Knowles Electronics, LLC, Itasca, IL (US)

(72) Inventor: Mark Niederberger, Einsiedeln (CH)

(73) Assignee: Knowles Electronics, LLC, Itasca, IL (US)

( * ) Notice: Subject to any disclaimer, the term of this patent is extended or adjusted under 35 U.S.C. 154(b) by 396 days.

(21) Appl. No.: 16/783,097

(22) Filed: Feb. 5, 2020

(65) Prior Publication Data

US 2020/0252728 A1   Aug. 6, 2020

(30) Foreign Application Priority Data

Feb. 6, 2019 (EP) .................................... 19155821

(51) Int. Cl.
| | |
|---|---|
| *H04R 19/04* | (2006.01) |
| *G01H 11/06* | (2006.01) |
| *H04R 1/40* | (2006.01) |
| *H04R 3/00* | (2006.01) |
| *H04R 3/04* | (2006.01) |
| *H02M 3/07* | (2006.01) |

(52) U.S. Cl.
CPC ............. *H04R 19/04* (2013.01); *G01H 11/06* (2013.01); *H04R 1/406* (2013.01); *H04R 3/005* (2013.01); *H04R 3/04* (2013.01); *H02M 3/07* (2013.01); *H04R 2201/003* (2013.01)

(58) Field of Classification Search
CPC ........ H04R 19/04; H04R 1/406; H04R 3/005; H04R 3/05; H04R 2201/003; G01H 11/06; H02M 3/07

USPC .................................. 381/113, 120; 73/654
See application file for complete search history.

(56) References Cited

U.S. PATENT DOCUMENTS

| | | |
|---|---|---|
| 7,190,038 B2 | 3/2007 | Dehe et al. |
| 7,473,572 B2 | 1/2009 | Dehe et al. |
| 7,781,249 B2 | 8/2010 | Laming et al. |
| 7,795,695 B2 | 9/2010 | Weigold et al. |
| 7,825,484 B2 | 11/2010 | Martin et al. |
| 7,829,961 B2 | 11/2010 | Hsiao |
| 7,856,804 B2 | 12/2010 | Laming et al. |
| 7,903,831 B2 | 3/2011 | Song |
| 9,503,814 B2 | 11/2016 | Schultz et al. |
| 9,641,137 B2 | 5/2017 | Duenser et al. |
| 9,831,844 B2 | 11/2017 | Yurrtas et al. |

(Continued)

FOREIGN PATENT DOCUMENTS

| | | |
|---|---|---|
| WO | 2016206939 A1 | 12/2016 |
| WO | WO-2016/206939 A1 | 12/2016 |

OTHER PUBLICATIONS

EP International Search Report for EP19155821, ams International AG, dated Aug. 19, 2019.

(Continued)

*Primary Examiner* — William A Jerez Lora
(74) *Attorney, Agent, or Firm* — Loppnow & Chapa

(57) ABSTRACT

A sensor arrangement is provided, including a first capacitive sensor and a second capacitive sensor. A charge pump is coupled to the first capacitive sensor and to the second capacitive sensor, the charge pump being operable to deliver a positive bias voltage. A differential output has a first terminal coupled to the first capacitive sensor and a second terminal coupled to the second capacitive sensor.

18 Claims, 6 Drawing Sheets

(56) References Cited

U.S. PATENT DOCUMENTS

| | | |
|---|---|---|
| 10,153,740 B2 | 12/2018 | Albers et al. |
| 2005/0207605 A1 | 9/2005 | Dehe et al. |
| 2007/0278501 A1 | 12/2007 | MacPherson et al. |
| 2008/0175425 A1 | 7/2008 | Roberts et al. |
| 2008/0267431 A1 | 10/2008 | Leidl et al. |
| 2008/0279407 A1 | 11/2008 | Pahl |
| 2008/0283942 A1 | 11/2008 | Huang et al. |
| 2009/0001553 A1 | 1/2009 | Pahl et al. |
| 2009/0180655 A1 | 7/2009 | Tien et al. |
| 2010/0046780 A1 | 2/2010 | Song |
| 2010/0052082 A1 | 3/2010 | Lee et al. |
| 2010/0128914 A1 | 5/2010 | Khenkin |
| 2010/0183181 A1 | 7/2010 | Wang |
| 2010/0246877 A1 | 9/2010 | Wang et al. |
| 2010/0290644 A1 | 11/2010 | Wu et al. |
| 2010/0322443 A1 | 12/2010 | Wu et al. |
| 2010/0322451 A1 | 12/2010 | Wu et al. |
| 2011/0013787 A1 | 1/2011 | Chang |
| 2011/0075875 A1 | 3/2011 | Wu et al. |
| 2015/0110291 A1 | 4/2015 | Furst et al. |
| 2016/0111954 A1 | 4/2016 | Bach et al. |
| 2016/0150325 A1* | 5/2016 | Oliaei ............... H04R 3/005 381/111 |
| 2016/0173992 A1* | 6/2016 | Nicollini ............ H04R 19/005 381/113 |
| 2016/0381455 A1* | 12/2016 | Zeleznik ............ H04R 29/006 381/113 |
| 2019/0387326 A1 | 12/2019 | Hansen et al. |
| 2020/0010315 A1 | 1/2020 | Tingleff et al. |
| 2020/0252729 A1 | 8/2020 | Mueller et al. |

OTHER PUBLICATIONS

EP Examination Report for EP19155821, Knowles Electronics, LLC, dated Mar. 1, 2022.

* cited by examiner

SENSOR ARRANGEMENT AND METHOD

CROSS-REFERENCE TO RELATED APPLICATION

This application claims the benefit of and priority to European Patent Application No. 19155821.2, filed Feb. 6, 2019, which is incorporated herein by reference in its entirety.

TECHNICAL FIELD

The present disclosure is related to a sensor arrangement, a mobile device having a sensor arrangement, a microphone device having a sensor arrangement and a method for providing a differential sensor signal.

BACKGROUND

Sensing arrangements may include a variety of sensors. In some embodiments, sensing arrangements may include capacitive sensors used for sensing acoustical energy. Additionally, capacitive sensors are used in other applications as well, for example, humidity sensors, acceleration sensors and electret microphones. In some embodiments, a capacitive sensor may include a micro-electromechanical (MEMs) device.

SUMMARY

According to one implementation, a sensor arrangement includes a first and a second capacitive sensor. A charge pump is coupled to the first capacitive sensor to deliver a positive bias voltage. Furthermore, the charge pump is coupled to the second capacitive sensor in order to deliver a positive bias voltage. In other words, the charge pump is a positive charge pump. The sensor arrangement further has a differential output. The differential output has two terminals. The first terminal is coupled to the first capacitive sensor and the second terminal is coupled to the second capacitive sensor. In other words, two single-ended capacitive sensors which provide single-ended signals are each coupled to one terminal of a differential output. The two capacitive sensors each receive a positive bias voltage delivered by a charge pump. The bias voltages of the two capacitive sensors can be identical or different.

In some embodiments, the terms "positive bias voltage" or "positive charge pump" refer to a positive voltage with reference to a reference potential, preferably with reference to substrate potential in the case that the charge pump is integrated on a semiconductor chip. In some embodiments, the proposed sensor arrangement connects two single-ended MEMS capacitive sensors to one or two positive charge pumps. Compared to conventional differential capacitive sensor arrangements, it is notable that two single-ended sensors which are relatively easy to implement are combined with a positive bias voltage generated by a charge pump. Therefore no negative charge pump and no negative bias voltage are necessary.

The first and the second capacitive sensors can be MEMS microphone sensors, humidity sensors, acceleration sensors or electret microphones. Of course, the proposed principle can also be applied to other types of capacitive sensors with single-ended signal output which are operable with a positive bias voltage delivered by a charge pump. In some embodiments, the first and the second capacitive sensors are integrated on the same chip. In some embodiments, the first and the second capacitive sensors are integrated on different dies in the same package. In some embodiments, the first and the second capacitive sensors are operable to detect the same parameter, e.g. sound pressure in the case of microphones. In some embodiments, the first and the second capacitive sensors are MEMS sensors. In some embodiments, the first and the second capacitive sensors are MEMS microphone sensors.

In some embodiments, the first capacitive sensor has two terminals. For example, one terminal is coupled to the diaphragm and one terminal is coupled to the backplate of the MEMS microphone sensor. The first terminal of the first capacitive sensor is coupled to a reference potential, for example to ground potential. The second terminal is coupled to the charge pump. In order to suppress DC portions of the signal, the second terminal is coupled to the first terminal of the differential output using a high pass filter to suppress DC portions, in particular to suppress the bias voltage created by the charge pump.

In some embodiments, the second capacitive sensor has a first terminal coupled to the charge pump and a second terminal coupled, directly or indirectly, to the second terminal of the differential output. In some embodiments, the coupling of the charge pump with the respective terminals of the first and second capacitive sensors is performed using anti-parallel diodes. Alternatively or additionally, a series resistance with a high or very high resistor value may be used. In some embodiments, the series resistance is greater than 1 GOhm in order to have a sufficiently low cut off frequency of the high-pass filter it is representing. Further, each of the anti-parallel diodes may be replaced by a MOS transistor connected as a diode or by a controlled current source.

In some embodiments, the first and the second capacitive sensor have the same geometric orientation. That means that, for example, for both sensors on a top side there is the top plate with the diaphragm and on a bottom plate is the backplate which the acoustic porthole faces. In some embodiments, the first and the second capacitive sensor have the same materials and the same geometry.

In some embodiments, a difference amplifier is coupled between the capacitive sensors and the differential output. For example, the second terminal of the first capacitive sensor is connected to one terminal of a series capacitor working as a high pass filter. The other terminal of this series capacitor is connected to an input of an amplifier. The output of the amplifier is connected to one terminal of the differential output. Similarly, the second terminal of the second capacitive sensor is connected to an input of an amplifier. The output of the amplifier is connected to the second terminal of the differential output. The two amplifiers may form a difference amplifier. The difference amplifier could have gain or could be a unity gain amplifier, depending on the application.

Each amplifier can have a feedback loop from the output back to its input. The feedback loop may have a low pass characteristic. For example, a low pass filter can be connected to the output of the amplifier. An output of the low pass filter can be connected, using anti-parallel diodes, back to the input of the amplifier, respectively. The low pass feedback serves for defining the DC operating point of the amplifier. Downstream of the differential output a radio frequency filter can be connected in a differential manner. Downstream of the radio frequency differential filter a CODEC with analog-to-digital conversion capability can be connected. The low pass filter in the feedback path can, for example, be a GmC filter. This can, for example, be implemented as an operational trans-conductance amplifier with a capacitor at the output side.

In some embodiments, the charge pump is operable to provide a first positive bias voltage to the first capacitive sensor and a second positive bias voltage to the second capacitive sensor. The first and the second bias voltage can be identical or different, depending on the application. The charge pump may be operable to deliver a positive bias voltage. This positive bias voltage can be in the range between 5 V and 60 V. In one embodiment the charge pump is operable to deliver a positive bias voltage between 10 V and 50 V.

According some embodiments, a mobile device has a sensor arrangement as described above. The mobile device can be a smartphone, tablet, smartwatch, wearable or the like. In some embodiments, a microphone device has a sensor arrangement as described above. The microphone device can be a studio microphone, a headset, a smart speaker, an active noise cancellation headphone or the like.

According some embodiments, a method for providing a differential sensor signal comprises generating a first capacitive sensor signal using a first positive charge pump voltage. Further on, the method includes generating a second capacitive sensor signal using a second positive charge pump voltage. The first and the second positive charge pump voltages are generated by a positive charge pump, respectively. Further on, the method may include providing the differential sensor signal derived from the first capacitive sensor signal and from the second capacitive sensor signal. The working principle and the positive effects of the method have already been described above with reference to the sensor arrangement. This description is incorporated herewith in order to avoid repetition.

Since the proposed principle may work without a negative charge pump which is typically necessary to supply differential MEMS microphone sensors, the proposed principle can be easily integrated in a semiconductor device like an ASIC and/or a package comprising several semiconductor dies. At the same time, the proposed method and arrangement maintain all advantages of a differential sensor architecture.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. Various embodiments are described in more detail below in connection with the appended drawings.

Figure 1:
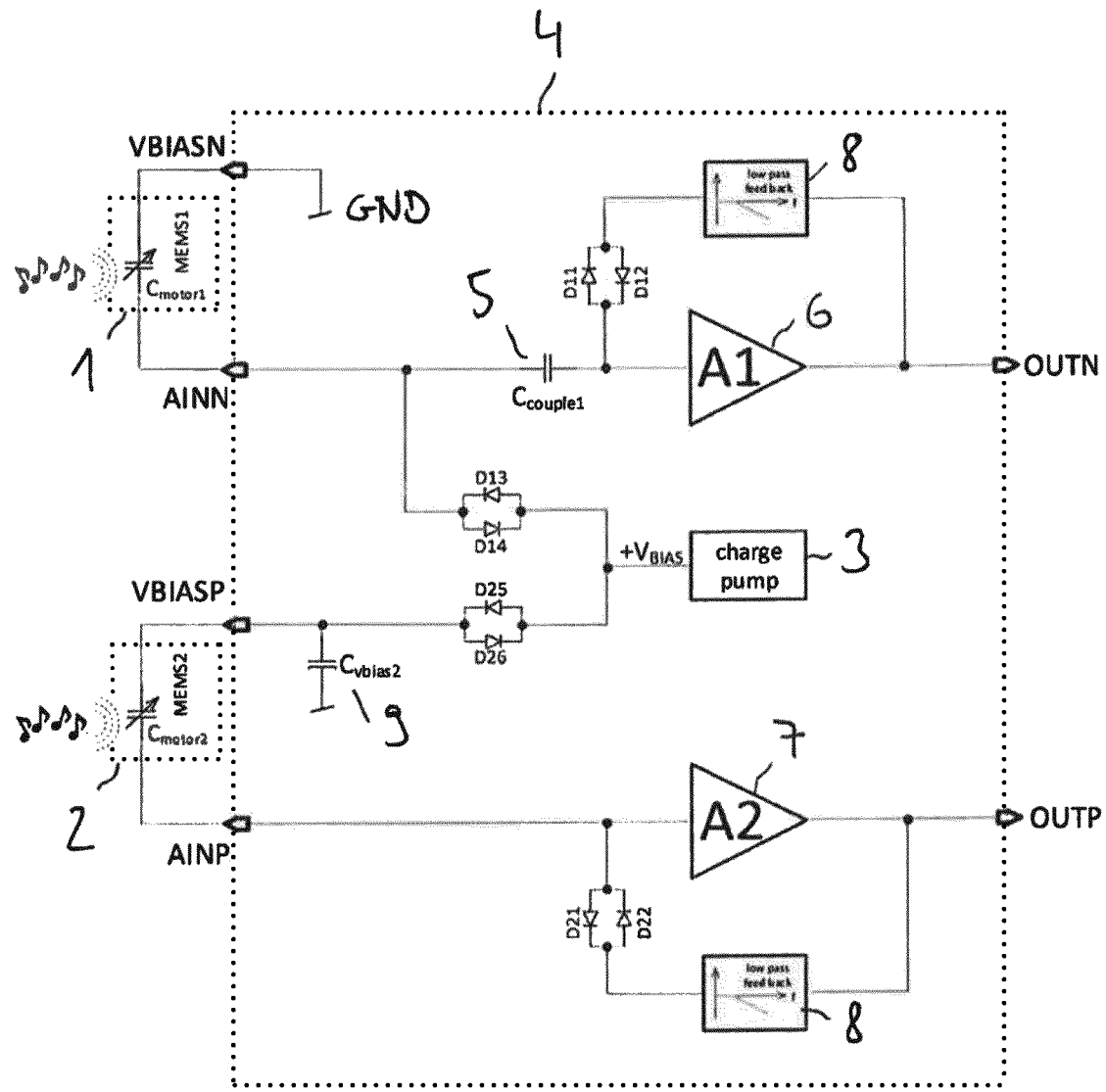
FIG. 1 shows an embodiment of a sensor arrangement.

In the following detailed description, various embodiments are described with reference to the appended drawings. The skilled person will understand that the accompanying drawings are schematic and simplified for clarity and therefore merely show details which are essential to the understanding of the disclosure, while other details have been left out. Like reference numerals refer to like elements or components throughout. Like elements or components will therefore not necessarily be described in detail with respect to each figure.

DETAILED DESCRIPTION

The following description is directed toward sensor arrangements. More particularly, sensor arrangements that include a capacitive sensor. One example of a capacitive sensor is a MEMS (micro electro mechanical systems) microphone. Such MEMS microphones may include a MEMS as a pressure dependent capacitor and an electronic interface circuit. However, capacitive sensors are used in other applications as well, for example humidity sensors, acceleration sensors and electret microphones.

In some embodiments, the capacitive sensor may have a differential architecture. Differential architectures have several advantages compared to single-ended architectures. The advantages at least include higher AOP (acoustic overlap point), improved SNR (signal-to-noise) ratio, improved PSRR (power supply rejection ratio) performance, improved disturber suppression and so on. In the case of MEMS microphones, differential capacitive sensor arrangements can be implemented in several ways. One way is to have differential MEMS having two backplates and a diaphragm in between. In that case, the capacitance that changes and is to be measured is constituted between the backplate and the diaphragm. Another way of implementation of differential MEMS microphone architectures is to use one single-ended MEMS with an interface circuit splitting the MEMS signal into a balanced differential signal. Another way of implementation is to use two single-ended MEMS or dual MEMS with one MEMS connected to a positive charge pump voltage and the other to a negative charge pump voltage. However, some differential architecture implementations may be difficult or costly to integrate in particular applications.

FIG. 1 shows an embodiment of a sensor arrangement comprising a first capacitive sensor 1 and a second capacitive sensor 2. A charge pump 3 is coupled to the first capacitive sensor 1 and to the second capacitive sensor 2 in a manner described below in more detail. The charge pump is operable to deliver a positive bias voltage +VBIAS. A differential output having a first terminal OUTN coupled to the first capacitive sensor 1 and having a second terminal OUTP coupled to the second capacitive sensor 2 is formed at an output side of an interface circuit 4. On its input side, the interface circuit 4 has four terminals VBIASN, AINN, VBIASP and AINP.

A first terminal of the first capacitive sensor 1 is connected via a first input terminal VBIASN of the interface circuit 4 to a reference potential terminal ground GND. A second terminal of the first capacitive sensor 1 is connected to a second input terminal AINN of the interface circuit 4 and from there via a series capacitor 5 to an input of an amplifier 6. A first terminal of the second capacitive sensor 2 is connected to a third terminal VBIASP of the interface circuit 4 and from there via anti-parallel connected diodes D25, D26 to an output of the charge pump 3. Similarly, the second input terminal AINN of the interface circuit 4 is connected via anti-parallel diodes D13, D14 to the output of the charge pump 3. The second terminal of the second capacitive sensor 2 is connected to the fourth input terminal AINP of the interface circuit 4 and from there to an input of another amplifier 7.

The output of the first amplifier 6 is connected to the first terminal OUTN of the differential output. The output of the second amplifier 7 is connected to the second terminal OUTP of the differential output of the interface circuit 4. Each amplifier 6, 7 has a feedback path from its output to its input. Each feedback path comprises a low pass filter 8 and, downstream of the low pass filter 8 in the feedback path a parallel connection of anti-parallel diodes D11, D12 and D21, D22, respectively.

The first and the second capacitive sensor 1, 2 are designed as MEMS microphone sensors with a single-ended output. The single-ended output is connected to the terminal AINN, AINP respectively. The bias voltage +VBIAS is a DC voltage decoupled with a capacitor 9 connected to the third terminal VBIASP of the interface circuit 4 on one side and on the other side to a reference potential. The second capacitive sensor 2 is connected between a positive bias voltage VBIASP and the fourth terminal of the interface circuit AINP which at the same time is the input of the amplifier 7.

If the capacitor value of the second capacitive sensor 2 changes, for example due to fluctuations in sound pressure, this will lead to a change of the voltage across the second capacitive sensor, assuming no charge transfer. Since the voltage on terminal VBIASP is fixed, the voltage on the amplifier input 7 at the terminal AINP will change in the opposite direction.

For the first capacitive sensor, the biasing is negative with respect to the input of the first amplifier 6. Instead of using a negative charge pump voltage, the voltage levels of the first capacitor sensor are shifted up by the bias voltage +VBIAS. Therefore, the decoupling capacitor 5 serves as a DC blocking capacitor and the bias voltage is fed through an anti-parallel diode pair D11, D12 to the input AINN. The negative terminal of the first capacitive sensor 1 is connected to the terminal VBIASN which is basically connected to ground potential.

A change of the first capacitor by a positive amount of charge may lead to a change in negative direction of the voltage across the first capacitive sensor with no charge transfer assumed. Since the voltage at the first terminal VBIASN is fixed to ground, the voltage at the input side of the first amplifier 6 will change in the negative direction with respect to ground.

Consequently the input signals at the differential terminals AINN, AINP on the input sides of the difference amplifier 6, 7 change differentially in the positive direction for the terminal AINP and in the negative direction for the terminal AINN under the given assumptions. The feedback path with the low pass filter 8 serves to set the DC operating points of the amplifiers 6, 7 which together form, and work as, a difference amplifier. One, several or all of the anti-parallel diode paths could be replaced by series resistances with high resistance value. The low pass filter 8 can, for example, be implemented as a GmC, for example as an operational transconductance amplifier with a capacitor on the output side.

Positive charge pump or positive bias voltage generated by the charge pump means a positive voltage with respect to ground or with respect to substrate potential, for example. Since the present circuit arrangement works with just a single positive bias voltage there is no need for generation of a negative bias voltage with a negative charge pump.

Figure 2:
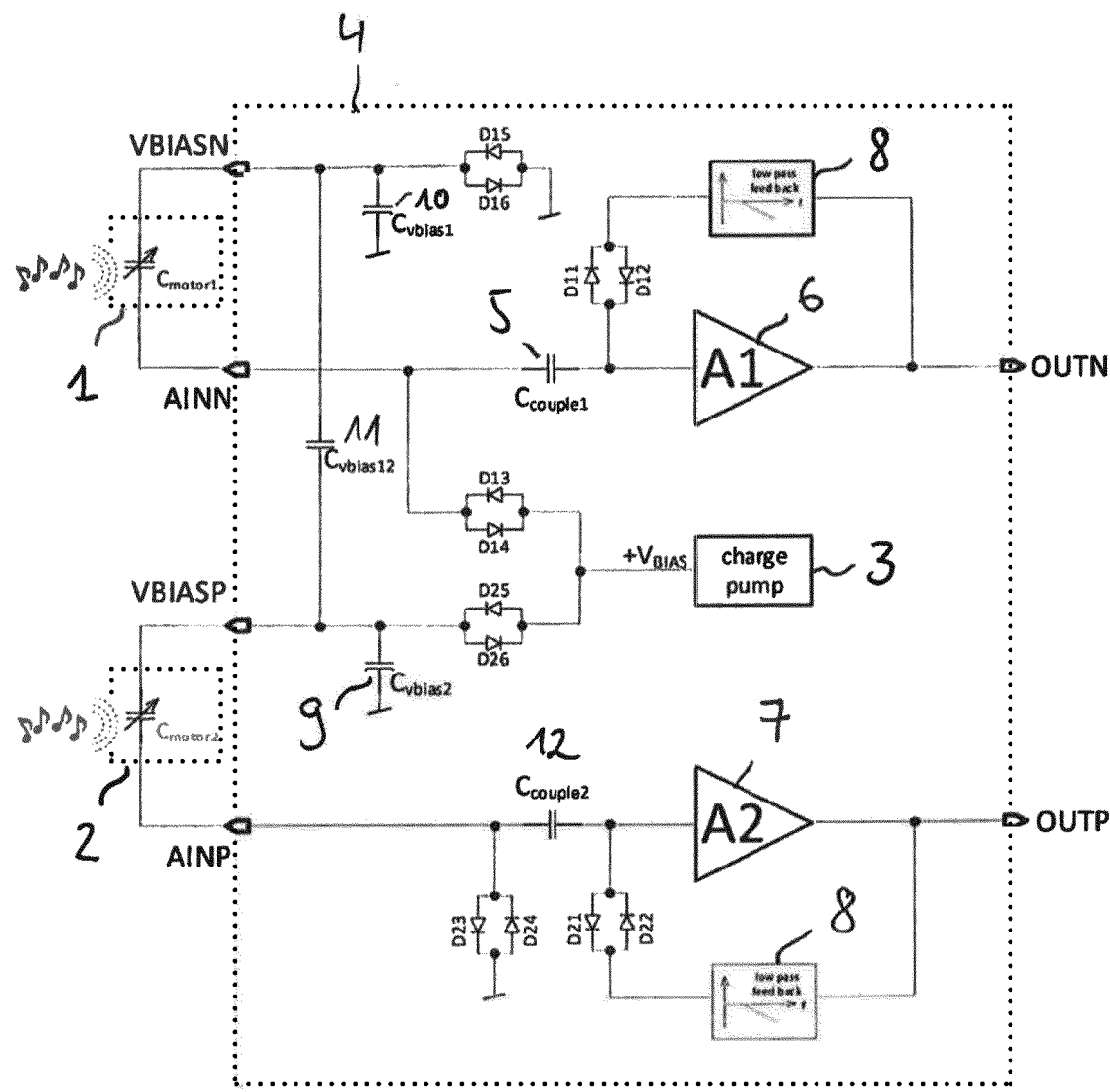
FIG. 2 shows another embodiment of a sensor arrangement.

FIG. 2 shows another embodiment of a sensor arrangement. The circuit arrangement of FIG. 2 comprises all parts and wiring which are shown in FIG. 1 with the same working principles and insofar is not described again here to avoid redundancy. In addition to the circuit elements shown in FIG. 1, an additional capacitor 10 is connected between the first terminal VBIASN of the interface circuit 4 and ground potential. Further on, another capacitor 11 is connected between the first and the third terminals VBIASN, VBIASP of the input side of the interface circuit 4.

The first terminal VBIASN of the input side of the interface circuit 4 is further connected to ground, not directly, but via an anti-parallel diode pair D15, D16. Another anti-parallel diode pair D23, D24 is connected between the fourth terminal AINP of the input side of the interface circuit 4 and ground potential. This terminal is also coupled via a series capacitor 12 to the input of a second amplifier 7. With these measures, impedance matching, symmetry of the circuit, et cetera may be improved.

Figure 3:
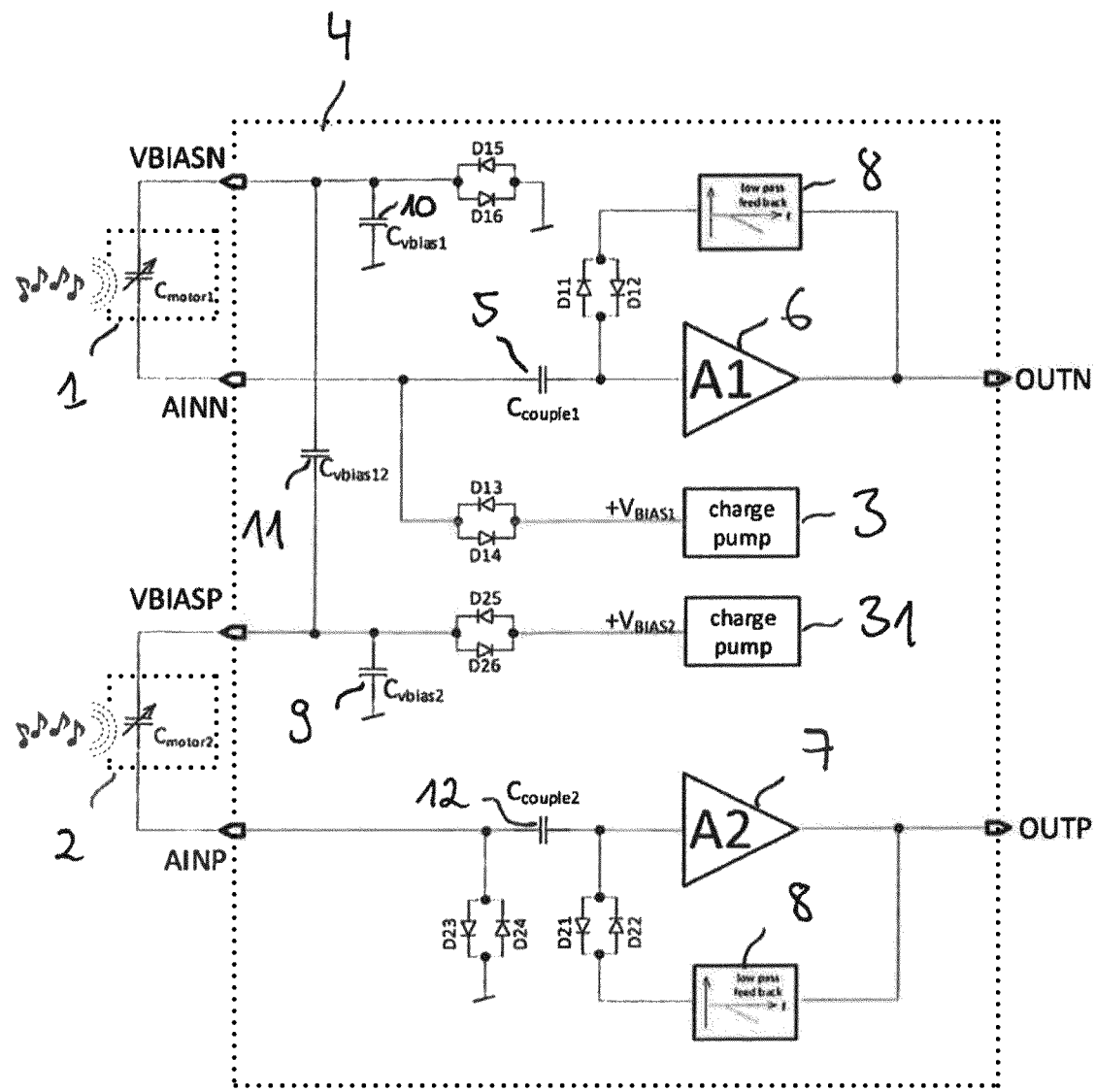
FIG. 3 shows another embodiment of a sensor arrangement with two positive charge pumps.

FIG. 3 shows another embodiment of a sensor arrangement which has all elements shown in FIG. 2 with its functionality and advantages and insofar is not described again here. However, instead of a single charge pump 3 connected to the second terminal AINN of the input side of the interface circuit supplying a first positive bias voltage +VBIAS1, an additional charge pump 31 is integrated on the interface circuit 4 generating a second positive bias voltage +VBIAS2. This second positive bias voltage +VBIAS2 is fed via the pair of anti-parallel diodes D25, D26 to the third terminal VBIASP of the input side of the interface circuit 4. The first charge pump 3 is no longer connected to this terminal but simply to the second terminal AINN of the input side of the interface circuit 4 via the anti-parallel diode D13, D14 providing the first bias voltage +VBIAS1. Compared to the previous embodiments of FIGS. 1 and 2, by using the embodiment of FIG. 3, two different bias voltages for the two capacitive MEMS sensors 1, 2 can be provided. In an alternative embodiment to FIG. 3, not shown in the drawings, there is only one charge pump having two taps at different voltage levels, that means one voltage is an intermediate voltage within the charge pump. In alternative embodiments for larger signal swing the anti-parallel diodes could be bootstrapped.

Figure 4:
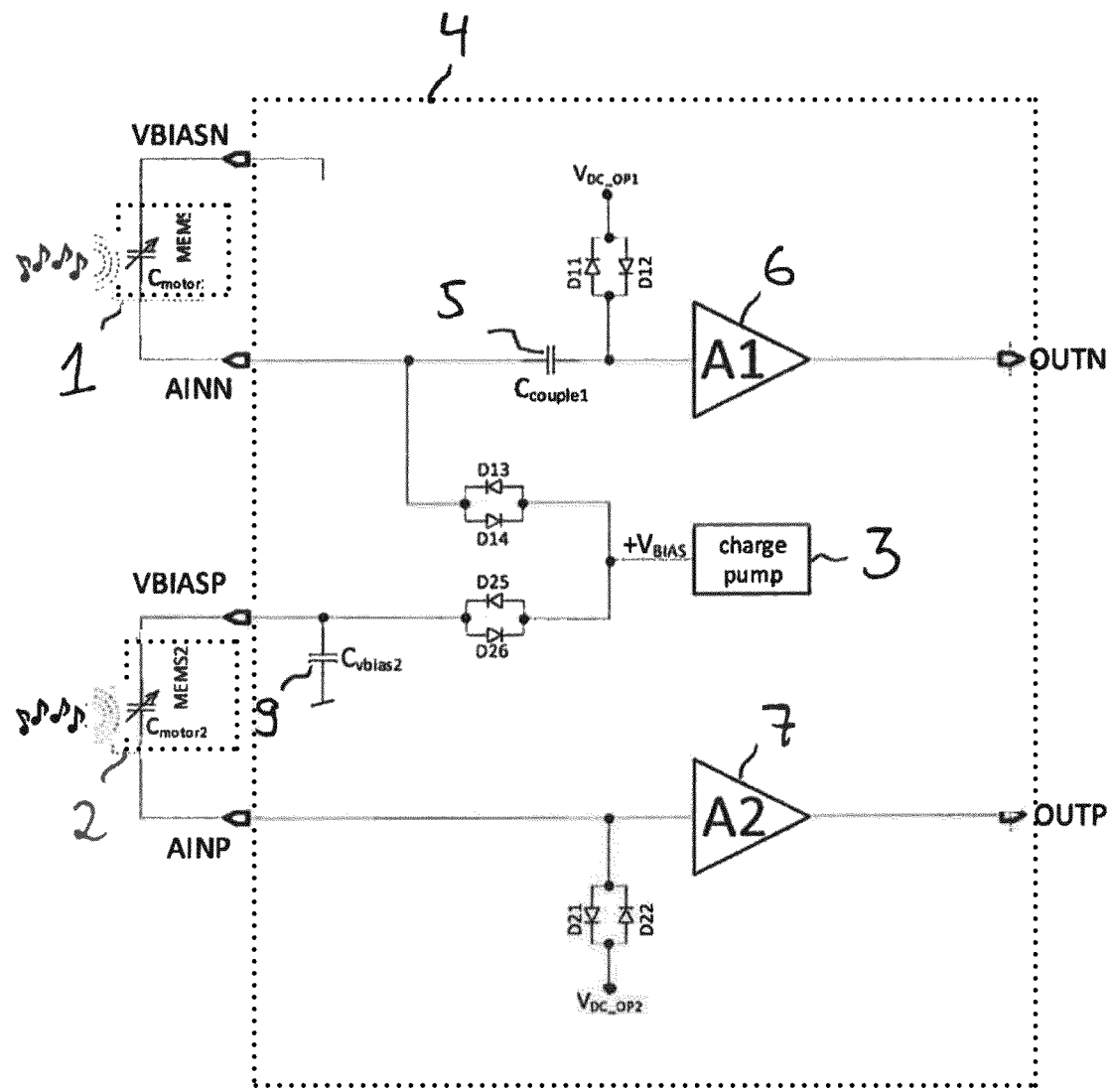
FIG. 4 shows another exemplary embodiment of a sensor arrangement.

FIG. 4 shows another embodiment of a sensor arrangement. Starting from FIG. 1, the embodiment of FIG. 4 is for the most part, in the parts used, their connection, their functions and the advantages achieved, identical with the embodiment of FIG. 1 and insofar not described again. What is described in the following are the differences between FIG. 4 and FIG. 1. In this respect, in FIG. 4 the feedback paths of the amplifiers 6, 7 including the low pass feedback filters 8 are omitted. Instead, the anti-parallel diode paths D11, D12 of amplifier 6 and D21, D22 of amplifier 7 are not connected to the output of the low pass filter but to a fixed DC voltage setting the operating point of the first and second amplifiers 6, 7, respectively.

All embodiments of the sensor arrangement shown in FIGS. 1 to 4 above have in common that no negative charge pump voltage is needed and just one or two positive charge pump voltages are used to bias the single-ended capacitive sensors 1 and 2. The fact that no negative charge pump is needed significantly reduces the requirements on ASIC technology with respect to maximum voltage. The voltage level of the charge pump can be between 10 and 50 V, for example.

In some circuits that require a negative charge pump voltage and a positive charge pump voltage, the voltage difference between the most positive and the most negative voltage on a chip could reach 100 V which would put high requirements on the ASIC technology with respect to maximum breakdown voltages, low leakage ESD protection elements etc. Therefore omitting the negative charge pump voltage is a significant improvement and reduces the requirements on ASIC technology and circuit design a lot.

Figure 5:
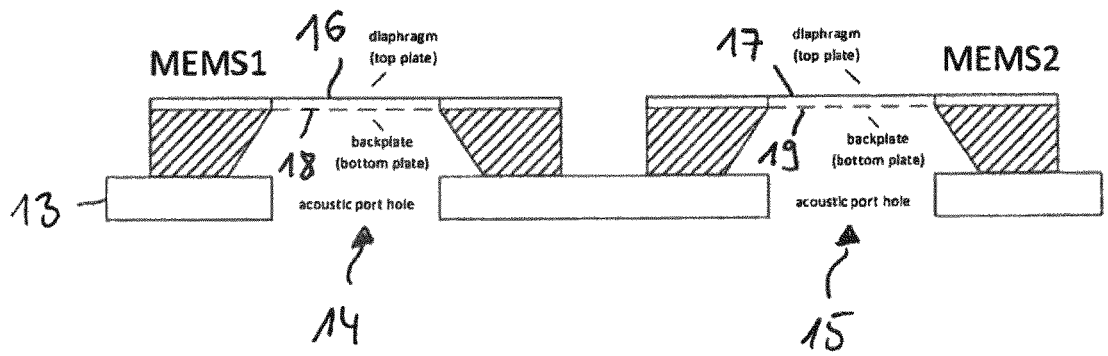
FIG. 5 shows an embodiment of MEMS microphone sensors.

FIG. 5 shows a cross-section of an embodiment of the two capacitive sensors which in this embodiment are MEMS microphone sensors MEMS1, MEMS2. As can be seen, in this embodiment the MEMS microphone sensors MEMS1, MEMS2 are arranged on a carrier 13 which has acoustic portholes 14, 15 facing in the same direction. The top plate of each MEMS microphone sensor MEMS1, MEMS2 is a diaphragm 16, 17 extending basically in parallel to the carrier 13. Between the acoustic porthole 14, 15 and the diaphragm 16, 17 is, as bottom plate, a backplate 18, 19 also extending in parallel to the top plates 16, 17. In other words, the two capacitive sensors 1, 2 designed as MEMS microphone sensors MEMS1, MEMS2 have the same geometric orientation and also the same materials, design and size.

As explained further above, the differential working principle of the two single-ended MEMS microphone sensors MEMS1, MEMS2 is created by the interface circuit 4 including the positive charge pump and the connections of the biasing to the interface circuits and the signal extraction for the useful signal of the differential signal.

Figure 6:
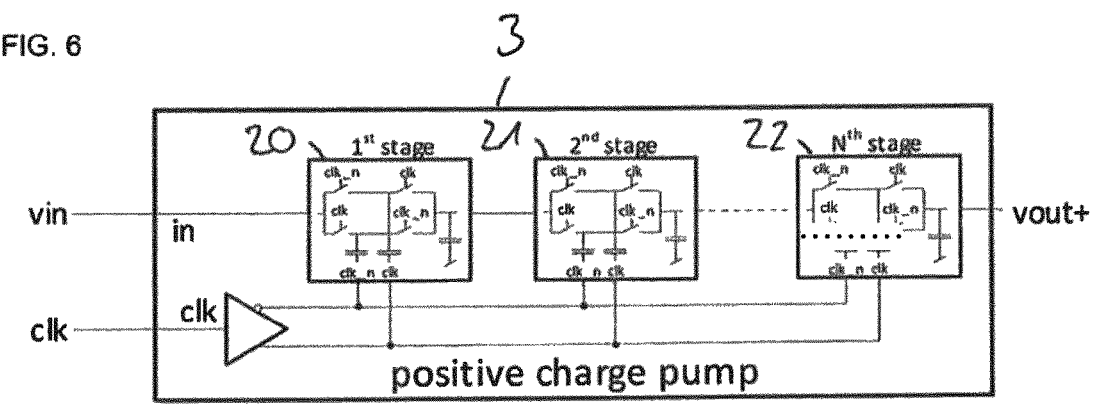
FIG. 6 shows an example of a positive charge pump.

FIG. 6 shows an exemplary embodiment of the positive charge pump 3 having an input terminal VIN, a clock terminal CLK and an output terminal VOUT+ at which the positive bias voltage +VBIAS is provided. The positive charge pump comprises N stages 20, 21, 22 coupled between the input VIN and the output VOUT+. The clock is inverted so that a clock signal and an inverted clock signal are provided to each stage 20, 21, 22. Each stage comprises several capacitors and switches in order to accumulate charge and to create a positive output voltage which is a magnification of the input voltage.

Figure 7:
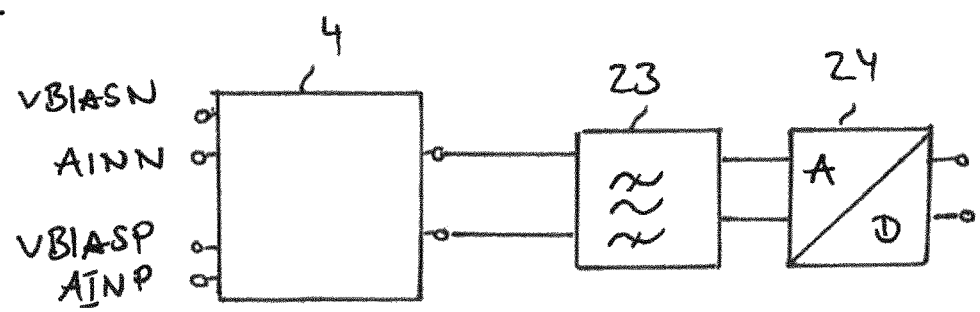
FIG. 7 shows an example of a sensor arrangement with further signal processing.

FIG. 7 shows a sensor arrangement with further signal processing. Downstream of the difference amplifier 6, 7 at the differential output of the interface circuit 4 a radio frequency filter 23 is coupled. Downstream of the radio frequency filter 23 an Analog/Digital Converter 24 is connected. At the output side of the Analog/Digital Converter 24 a digital sensor signal is provided.

Figure 8:
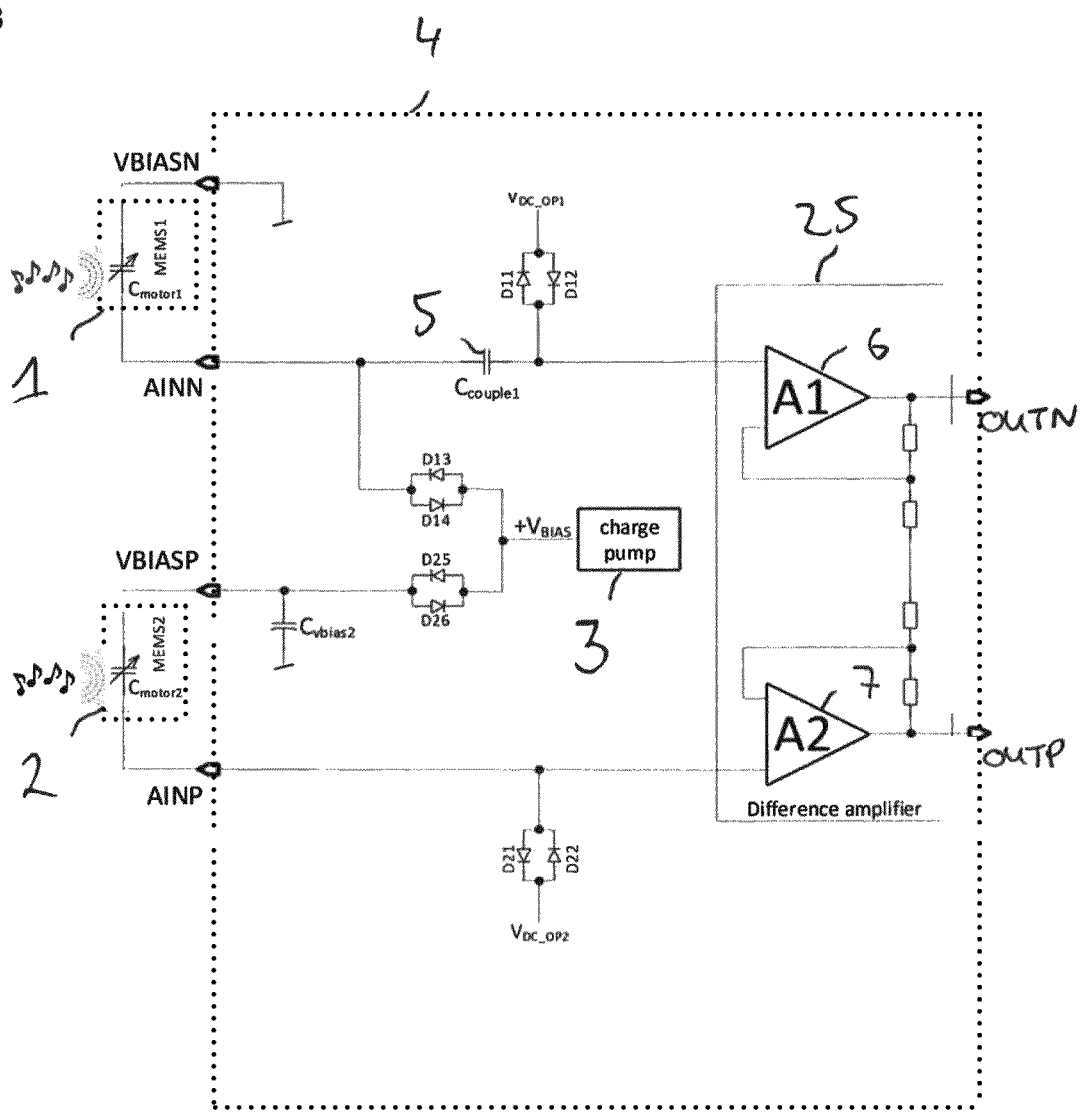
FIG. 8 shows another exemplary embodiment of a sensor arrangement.

FIG. 8 shows another embodiment of a sensor arrangement. Starting from FIG. 4, the embodiment of FIG. 8 is for the most part, in the parts used, their connection, their functions and the advantages achieved, identical with the embodiment of FIG. 4 and is insofar not described again. What is described in the following are the differences between FIG. 8 and FIG. 4. In this respect, in FIG. 8 a difference amplifier 25 comprises the amplifiers 6, 7, which are connected to each other by a chain of resistors. At respective tapping nodes, the chain of resistors feeds back to one of the inputs of each of the amplifiers 6, 7, respectively. The difference amplifier 25 has gain or can be a unity gain amplifier.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A sensor arrangement, comprising:
   a first capacitive sensor having a first terminal coupled to a reference potential;
   a second capacitive sensor;
   a charge pump coupled to a second terminal of the first capacitive sensor and to a first terminal of the second capacitive sensor, the charge pump being operable to produce a single positive bias voltage relative to the reference potential, and to separately deliver the single positive voltage to each of the first capacitive sensor and to the second capacitive sensor; and
   a differential output having a first terminal coupled to the second terminal of the first capacitive sensor and having a second terminal coupled to a second terminal of the second capacitive sensor.

2. The sensor arrangement of claim 1, wherein the first and the second capacitive sensor are operable to detect the same parameter.

3. The sensor arrangement of claim 2, wherein the first and the second capacitive sensors are MEMS sensors.

4. The sensor arrangement of claim 1, wherein a high-pass filter is coupled between the second terminal of the first capacitive sensor and the first terminal of the differential output.

5. The sensor arrangement of claim 1, wherein the first and the second capacitive sensor have the same geometric orientation.

6. The sensor arrangement of claim 1, wherein a difference amplifier is coupled to the differential output.

7. The sensor arrangement of claim 6, wherein an analog-to-digital converter (ADC) is coupled downstream the differential output and a radio frequency filter is coupled between the differential output and the ADC.

8. The sensor arrangement of claim 1, wherein the charge pump is operable to provide a first positive bias voltage to the first capacitive sensor and a second positive bias voltage to the second capacitive sensor.

9. A sensor interface circuit comprising:
   a first voltage bias terminal and a first amplifier input terminal adapted to be coupled to a first capacitive sensor;
   a second voltage bias terminal and a second amplifier input terminal adapted to be coupled to a second capacitive sensor;
   a first differential output terminal and a second differential output terminal across which a differential output is adapted to be produced;
   a first amplifier having an input coupled to the first amplifier input terminal and an output coupled to the first differential output terminal,
   a second amplifier having an input coupled to the second amplifier input terminal and an output coupled to the second differential output terminal, and
   a charge pump adapted for producing a single positive bias voltage relative to a reference voltage;
   wherein the single positive bias voltage produced by the charge pump is separately delivered to each of the first amplifier input terminal and the second voltage bias terminal; and
   wherein the first voltage bias terminal is coupled to the reference voltage.

10. A sensor interface circuit in accordance with claim 9, wherein the input of the first amplifier is coupled to first amplifier input terminal and the positive bias voltage produced by the charge pump via a DC blocking capacitor.

11. A sensor interface circuit in accordance with claim 9, wherein the positive bias voltage produced by the charge pump is coupled to the first amplifier input terminal, and the second bias voltage terminal via a respective anti-parallel diode.

12. A sensor interface circuit in accordance with claim 9, wherein the reference voltage is a ground potential.

13. A sensor interface circuit in accordance with claim 9, wherein the input of the first amplifier and the input of the second amplifier are each associated with a respective defined DC operating point.

14. A sensor interface circuit in accordance with claim 13, wherein the respective defined DC operating point is associated with a respective feedback loop.

15. A sensor interface circuit in accordance with claim 14, wherein each of the respective feedback loops includes a low pass filter having an input coupled to a respective one of the outputs of the first and second amplifiers, and an output coupled to a respective one of the inputs of the first and second amplifiers.

16. A sensor interface circuit in accordance with claim 13, wherein the respective defined DC operating points are each coupled to the respective one of the input of the first amplifier and the input of the second amplifier via a respective anti-parallel diode.

17. A sensor interface circuit in accordance with claim 9, further comprising:
   a first capacitive sensor coupled across the first voltage bias terminal and the first amplifier input terminal; and
   a second capacitive sensor coupled across the second voltage bias terminal and the second amplifier input terminal.

18. A method for providing a differential sensor signal, the method comprising:
   producing a single positive bias voltage relative to a reference voltage by a charge pump, wherein the single positive bias voltage produced by the charge pump is separately delivered to each of a first amplifier input terminal of a first amplifier and a second voltage bias terminal of a second amplifier, wherein the reference voltage is coupled to a first voltage bias terminal of the first amplifier;
   creating a first amplifier output signal in the first amplifier from a voltage detected across the first amplifier input terminal of the first amplifier and the first voltage bias terminal of the first amplifier, which are adapted to be coupled to a first voltage sensor;

creating a second amplifier output signal in the second amplifier from a voltage detected across a second amplifier input terminal of the second amplifier and the second voltage bias terminal of the second amplifier, which are adapted to be coupled to a second voltage sensor; and providing a differential sensor signal across the first amplifier output signal and the second amplifier output signal.

* * * * *